United States Patent
De et al.

(10) Patent No.: US 10,817,224 B2
(45) Date of Patent: Oct. 27, 2020

(54) PREEMPTIVE DECOMPRESSION SCHEDULING FOR A NAND STORAGE DEVICE

(71) Applicant: QUALCOMM INCORPORATED, San Diego, CA (US)

(72) Inventors: Subrato Kumar De, San Diego, CA (US); Dexter Chun, San Diego, CA (US); Yanru Li, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 244 days.

(21) Appl. No.: 15/191,400

(22) Filed: Jun. 23, 2016

(65) Prior Publication Data
US 2017/0371595 A1    Dec. 28, 2017

(51) Int. Cl.
*G06F 3/06* (2006.01)
*G06F 9/445* (2018.01)
(Continued)

(52) U.S. Cl.
CPC .......... *G06F 3/0679* (2013.01); *G06F 3/0604* (2013.01); *G06F 3/0638* (2013.01);
(Continued)

(58) Field of Classification Search
CPC .................... G06F 12/0862; G06F 2212/6028
See application file for complete search history.

(56) References Cited

U.S. PATENT DOCUMENTS 6,003,115 A * 12/1999 Spear ................... G06F 12/0862
711/113
6,195,024 B1 * 2/2001 Fallon ....................... G06T 9/00
341/51
(Continued)

OTHER PUBLICATIONS

Ahn S., et al., "A Compressed File System Manager for Flash Memory Based Consumer Electronics Devices", IEEE Transactions on Consumer Electronics, Aug. 1, 2013, vol. 59, No. 3, XP011529325, ISSN: 0098-3063, DOI: 10.1109/TCE.2013.6626236 [retrieved on Oct. 8, 2013], pp. 544-549.
(Continued)

*Primary Examiner* — William B Partridge
*Assistant Examiner* — Eric T Loonan
(74) *Attorney, Agent, or Firm* — Smith Tempel Blaha LLC/Qualcomm

(57) ABSTRACT

Systems, methods, and computer programs are disclosed for scheduling decompression of an application from flash storage. One embodiment of a system comprises a flash memory device and a preemptive decompression scheduler component. The preemptive decompression scheduler component comprises logic configured to generate and store metadata defining one or more dependent objects associated with the compressed application in response to an application installer component installing a compressed application to the flash memory device. In response to a launch of the compressed application by an application launcher component, the preemptive decompression scheduler component determines from the stored metadata the one or more dependent objects associated with the compressed application to
(Continued)

be launched. The preemptive decompression scheduler component preemptively schedules decompression of the one or more dependent objects based on the stored metadata.

30 Claims, 6 Drawing Sheets

(51) Int. Cl.
    *G06F 12/02*         (2006.01)
    *G06F 8/61*          (2018.01)

(52) U.S. Cl.
    CPC ............ *G06F 8/63* (2013.01); *G06F 9/44505* (2013.01); *G06F 9/44521* (2013.01); *G06F 9/44578* (2013.01); *G06F 12/0246* (2013.01); *G06F 2212/401* (2013.01); *G06F 2212/7207* (2013.01)

(56) References Cited

U.S. PATENT DOCUMENTS

| | | | |
|---|---|---|---|
| 6,510,499 B1* | 1/2003 | Aaker | G06F 12/08 |
| | | | 711/154 |
| 6,918,106 B1* | 7/2005 | Burridge | G06F 9/44521 |
| | | | 717/100 |
| 7,831,894 B2 | 11/2010 | Lee et al. | |
| 8,259,799 B2 | 9/2012 | Veltman et al. | |
| 2001/0052038 A1* | 12/2001 | Fallon | G06F 3/0613 |
| | | | 710/68 |
| 2004/0172525 A1 | 9/2004 | Rosay | |
| 2005/0013181 A1 | 1/2005 | Adelmann et al. | |
| 2006/0023789 A1* | 2/2006 | Yamashita | G06F 12/0862 |
| | | | 375/240.16 |
| 2009/0199190 A1* | 8/2009 | Chen | G06F 9/383 |
| | | | 718/102 |
| 2015/0193155 A1* | 7/2015 | Sarcone | G06F 12/0862 |
| | | | 714/764 |
| 2015/0381589 A1 | 12/2015 | Tarasuk-Levin et al. | |

OTHER PUBLICATIONS

Hyun S., et al., "LecramFS: an Efficient Compressed File System for Flash-based Portable Consumer Devices", IEEE Transactions on Consumer Electronics, May 1, 2007, vol. 53, No. 2, XP011381806, ISSN: 0098-3063, DOI: 10.1109/TCE.2007.381719, pp. 481-488.
International Search Report and Written Opinion—PCT/US2017/034858—ISA/EPO—dated Aug. 29, 2017.
Makatos T., et al., "ZBD: Using Transparent Compression at the Block Level to Increase Storage Space Efficiency", International Workshop on Storage Network Architecture and Parallel I/OS, May 3, 2010, XP031752982, ISBN: 978-1-4244-6810-2, pp. 61-70.
Park Y., et al., "zFTL: Power-efficient Data Compression Support for NAND Flash-based Consumer Electronics Devices", IEEE Transactions on Consumer Electronics, Aug. 1, 2011, vol. 57, No. 3, XP011386554, ISSN: 0098-3063, DOI: 10.1109/TCD.2011.6018868, pp. 1148-1156.

\* cited by examiner

PREEMPTIVE DECOMPRESSION SCHEDULING FOR A NAND STORAGE DEVICE

DESCRIPTION OF THE RELATED ART

Non-volatile storage, such as flash storage, is incorporated in various types of computing devices, including portable computing devices (e.g., cellular telephones, smart phones, tablet computers, portable digital assistants (PDAs), portable game consoles, wearable devices, and other battery-powered devices). To address user demands, the capacity of NAND flash storage in portable computing devices continues to increase. However, larger NAND flash storage significantly increases the cost of portable computing devices. A common solution to cost pressure is to implement file system compression, which keeps user data as compact as possible. While compression solutions can temporarily extend the limited capacity of NAND flash storage, the process of compressing/decompressing application data and/or code negatively impacts performance of the portable computing device and increases power consumption, which undesirably reduces battery life.

For example, compressing data and/or code in NAND, lengthens random read latency. The longer latency for performing random reads makes NAND unsuitable for direct code execution. Code needs to be downloaded from NAND to volatile memory (e.g., dynamic random access memory (DRAM)), and then executed from DRAM. Furthermore, NAND storage is read and written in blocks. Before writing to NAND, the code/data may be encoded, which requires the implementation of fast-encoding algorithms. After reading NAND, the compressed code/data needs to be decoded, which may significantly limit device performance.

Accordingly, there is a need for improved systems and methods for scheduling decompression of compressed objects in NAND storage to increase storage capacity without negatively impacting device performance and user experience.

SUMMARY OF THE DISCLOSURE

Systems, methods, and computer programs are disclosed for preemptively scheduling decompression of compressed objects in flash storage. One embodiment of a system comprises a flash memory device and a preemptive decompression scheduler component. The preemptive decompression scheduler component comprises logic configured to generate and store metadata defining one or more dependent objects associated with the compressed application in response to an application installer component installing a compressed application to the flash memory device. In response to a launch of the compressed application by an application launcher component, the preemptive decompression scheduler component determines from the stored metadata the one or more dependent objects associated with the compressed application to be launched. The preemptive decompression scheduler component preemptively schedules decompression of the one or more dependent objects based on the stored metadata.

An embodiment of a method comprises generating metadata for a compressed application installed on a flash memory device. The metadata defines one or more dependent objects associated with the compressed application. The metadata is stored in a memory. In response to a launch of the compressed application, the one or more dependent objects associated with the compressed application to be launched are determined from the stored metadata. The method further comprises preemptively scheduling decompression of the one or more dependent objects based on the stored metadata.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "communication device," "wireless device," "wireless telephone", "wireless communication device," and "wireless handset" are used interchangeably. With the advent of third generation ("3G") wireless technology and four generation ("4G"), greater bandwidth availability has enabled more portable computing devices with a greater variety of wireless capabilities. Therefore, a portable computing device may include a cellular telephone, a pager, a PDA, a smartphone, a navigation device, or a hand-held computer with a wireless connection or link.

Figure 1:
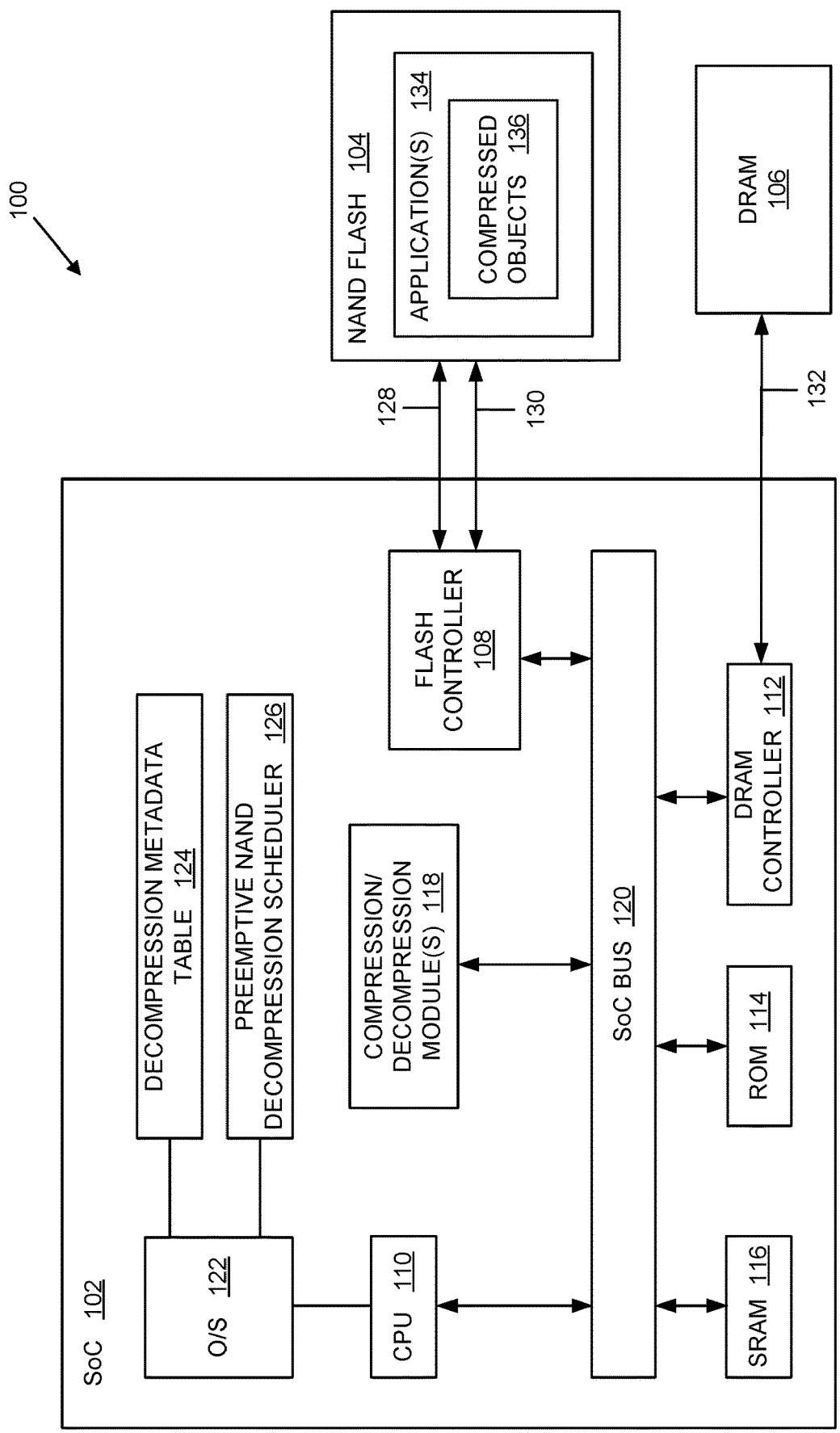
FIG. 1 is a block diagram of an embodiment of a system for providing preemptive decompression of compressed objects in flash storage.

FIG. 1 illustrates a system 100 for preemptively decompressing compressed objects in flash storage. The system 100 comprises a system on chip (SoC) 102 electrically coupled to a flash memory device (e.g., NAND flash 104) and a volatile random access memory (VRAM), such as, a dynamic random access memory (DRAM) 106. The SoC 102 may be electrically coupled to the NAND flash 104 via a control bus 128 and a data bus 130. The SoC 102 may be electrically coupled to the DRAM 106 via a bus 132. The system 100 may be implemented in any computing device, including a personal computer, a workstation, a server, and a portable computing device (PCD), such as a cellular telephone, a smartphone, a portable digital assistant (PDA), a portable game console, a navigation device, a tablet computer, a wearable device, such as a sports watch, a fitness tracking device, etc., or other battery-powered, web-enabled devices.

The SoC 102 comprises various on-chip components, including a central processing unit (CPU) 110 that executes an operating system (O/S) 122, a DRAM controller 112, static random access memory (SRAM) 116, read only memory (ROM) 114, compression/decompression module(s) 118, and a flash controller 108 interconnected via a SoC bus 120. The SoC 102 may include one or more memory clients that request memory resources from the DRAM 106 and the NAND flash 104. The memory clients may comprise one or more processing units (e.g., central processing unit (CPU) 110, a graphics processing unit (GPU), a digital signal processor (DSP), etc.), a video encoder, or other clients requesting read/write access to the NAND flash 104 and the DRAM 106.

In the embodiment illustrated in FIG. 1, the NAND flash 104 is separate from the SoC 102, although in other embodiments the NAND flash 104 may be physically attached or stacked onto the SoC die and reside in the same physical package as the SoC die. As known in the art, the NAND flash 104 may include a controller and a main array for storing physical pages. The CPU 110 residing on the SoC 102 reads and/or writes data in units of logical pages to the NAND flash 104 via the flash controller 108. The data is stored and retrieved from the physical pages of the main array along with error correction bit(s) generated/checked by an error correcting code (ECC) module 136.

The compression/decompression module(s) 118 comprise logic for compressing application code/data and storing the compressed code/data in NAND flash 104. When the compressed code/data is requested, the compression/decompression module(s) 118 uncompresses the application code/data stored in NAND flash 104 and then executes the uncompressed code/data. It should be appreciated that the compression/decompression module(s) 118 may comprise software modules executed by the CPU 110. In other embodiments, the compression/decompression module(s) 118 may comprise a separate hardware device, co-processor, etc. with dedicated RAM for speeding up the compression/decompression.

As illustrated in FIG. 1, the system 100 further comprises one or more module(s) (e.g., preemptive NAND decompression scheduler 126) for preemptively scheduling the decoding/decompressing of dependent compressed objects 136 ahead-of-time when the application 134 is launched and the application code/data is read from NAND flash 104. It should be appreciated that the application 134 may comprise various types of applications.

In an embodiment, the application 134 may comprise a mobile application. As known in the art, a typical application for a portable computing device, such as a smartphone, may comprise an aggregation of multiple shared native executable library files, and library files for the platform runtime (e.g., Dalvik/ART for Android, Objective-C runtime for iOS). The data files may comprise various formats, including, for example, XML, HTML, text files and/or files in other formats, all packaged together. It should be appreciated that all the various component files of various types that create the application are referred to as "objects". In an application in compressed form, all the objects that form the application may also be in compressed form. Since the application is depending on these objects, the objects in compressed form in the compressed application are referred to as "dependent" compressed objects.

It should be further appreciated that some of the objects in the application may further depend on other objects that may be directly available in the platform. For example, a shared executable object file library (libwebcore.so) for a browser application may be dependent on a platform executable object library (libbionic.so and libicu.so). In this case, the platform shared executable object files (libbionic.so and libicu.so) may comprise dependent objects and, if they are present in compressed form, may comprise "dependent" compressed objects.

As known in the art, the compressed objects may be decompressed when the application first accesses them. Therefore, for dynamically loaded shared executable object libraries that are present in compressed form, the decompression may occur when the platform's dynamic linker loader (DLL) loads them. Similarly, for various data files and data caches used by the application and maintained as compressed files, the decompression may occur when the application needs to access any data in those files. It should be appreciated that these activities may happen some period of time after the application launch, in which case the decompression may introduce additional delays for their access at the time when they are needed. One of ordinary skill in the art will appreciate that the term "preemptive decompression" means that any of these type of compressed objects are decompressed upfront during the application launch time, which occurs before they are actually accessed or needed by the application. The term "preemptive scheduling" refers to scheduling the decompression of these compressed objects upfront during the application launch time, rather than having a lazy schedule of decompression activity just before the compressed objects are needed or accessed by the executing application.

In this regard, the system 100 provides a mechanism of preemptive scheduling and preemptive decompression upfront during application launch, which enables the dependent compressed objects to be decompressed "ahead-of-time" before they are actually needed or accessed by the executing application. It should be appreciated that this mechanism may provide various benefits. For example, one benefit may be in reducing sudden stalls or delays during the execution of the application because the application does not have to wait for decompression of the dependent objects. Furthermore, moving the decompression upfront does not slow down the launch times because the decompression may occur parallel and independent of a critical path of the activities needed for the application launch. Another benefit may involve reducing the launch times of the application when multiple dependent compressed objects are needed sequentially during application launching as a sequential dependency chain because all the compressed objects in the sequential dependency chain may be decompressed simultaneously if sufficient parallelism is available through multiple decompression units. In this manner, the system 100 may provide the overall benefits of reducing latency and reducing intermediate stalls, thereby improving user experience.

The preemptive NAND decompression scheduler 126 generates specially configured metadata for one or more installed applications 134. The metadata may be stored in a decompression metadata table 124. As described below in more detail, the metadata for an application 134 may be statically generated at application installation time using high-level information. In an embodiment, the decompression metadata table for an application 134 may comprise information about one or more dependent libraries, code objects, size-constrained blocks, application data, files, etc. for one or more installed applications 134. When an application 134 is launched, the decompression metadata table 124 is accessed and used to preemptively decode/decompress ahead-of-time the dependent compressed objects 136. The metadata table 124 may be dynamically updated based on the execution activity of the application(s) 134. In an embodiment, the O/S 122 may generate and/or manage the decompression metadata table 124, as well as trigger the preemptive decoding/decompression of the compressed objects 136.

Figure 2:
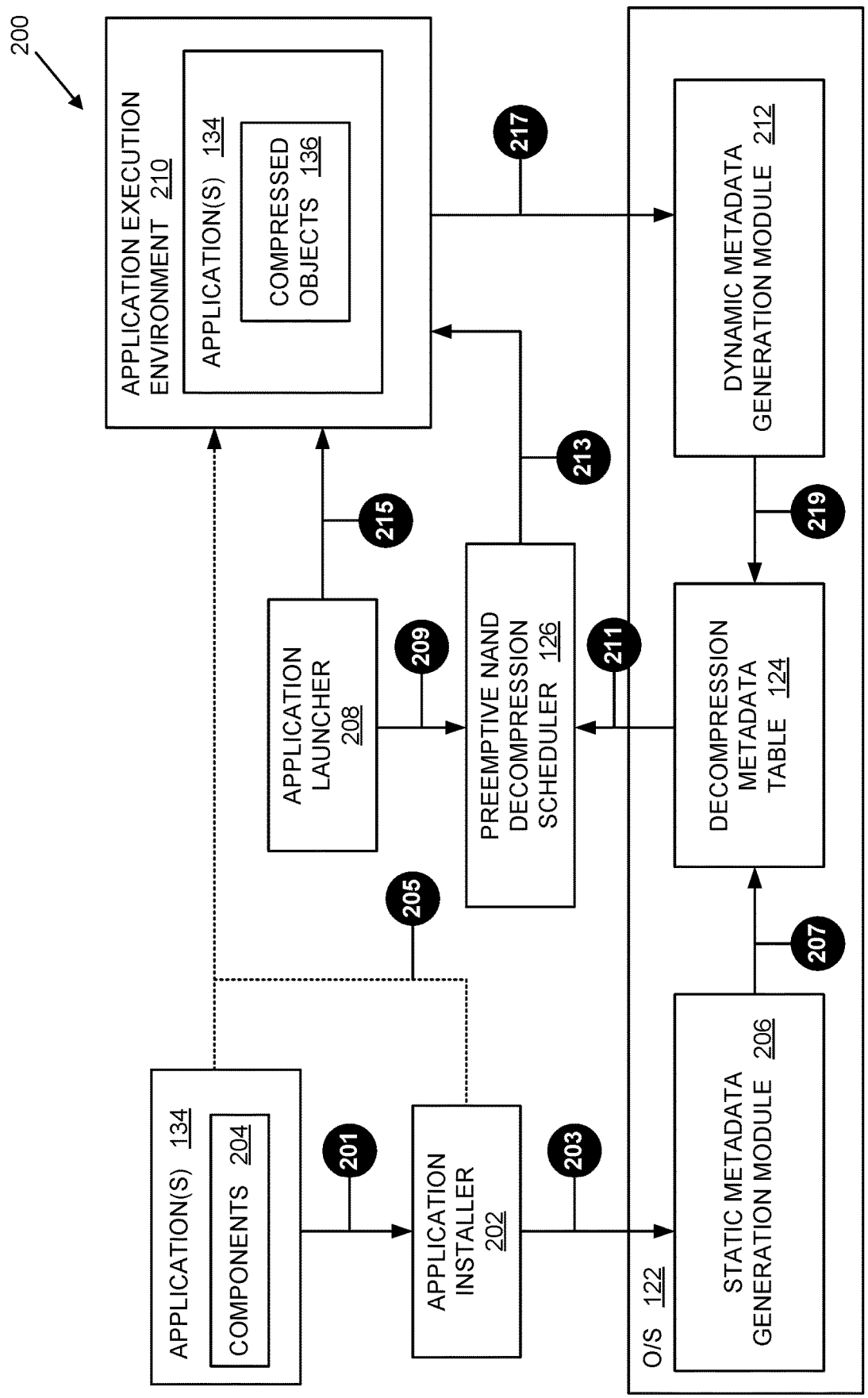
FIG. 2 is a combined block/flow diagram illustrating the operation of an embodiment of the preemptive NAND decompression scheduler of FIG. 1.

FIG. 2 illustrates an exemplary implementation of the preemptive NAND decompression scheduler 126. The preemptive NAND decompression scheduler 126 may interface with an application installer component 202, the O/S 122, an application launcher component 208, and the application execution environment 210. The application installer component 202 is configured to install an uncompressed application 134 comprising uncompressed components 204 in NAND flash storage 104. The application installer component 202 may instruct the compression/decompression module(s) 118 to compress the uncompressed components 204 and store the corresponding compressed components 136 in the NAND flash storage 104.

In other embodiments, the application installer component 202 may also directly install a compressed application if the application is received directly by the system 100 in compressed form. For example, a platform "App store" may maintain applications or "apps" in compressed form to save bandwidth when downloading the apps to computing devices. In these cases, a matching compression/decompression algorithm may be used to decompress the compressed application directly received. In such cases, the metadata stored in the decompression metadata table 124 may be created the first time the compressed application is uncompressed and launched by the application launcher component 202 in the conventional way. The preemptive scheduling and preemptive decompression will become effective for any future decompression of the compressed application and it's compressed objects when the application is launched in the future.

In operation, the application installer component 202 receives an installation instruction for initiating the installation of the application 134 (reference numeral 201). In response to the installation instruction, the application launcher component 202 initiates static metadata generation (reference numeral 203) and instructs the compression/decompression module(s) 118 to compress the uncompressed components 204 and store the corresponding compressed components 136 in the NAND flash storage 104 (reference numeral 205). As illustrated in FIG. 2, static metadata generation module 206 may be configured to generate metadata defining one or more dependent objects. The generated metadata for the application 134 may be stored in the decompression metatable 124 (reference numeral 207).

It should be appreciated that the metadata for the dependent objects may be statically generated, during application installation time, in various ways depending on, for example, the application execution environment 210, the O/S 122, the type of application code, a package file format used by the O/S 122, etc. For example, where the O/S 122 comprises the Android mobile operating system, the static metadata generation module 206 may statically create the metadata from the Android application package (APK). In other embodiments, the package file format may comprise the Executable and Linkable Format (ELF) used for Unix operating systems and the Portable Execution (PE) format used for Windows operating systems. Regardless the package file format, the static metadata generation module 206 generates one or more dependent objects or components from the executable/object-file/libraries.

Figure 4:
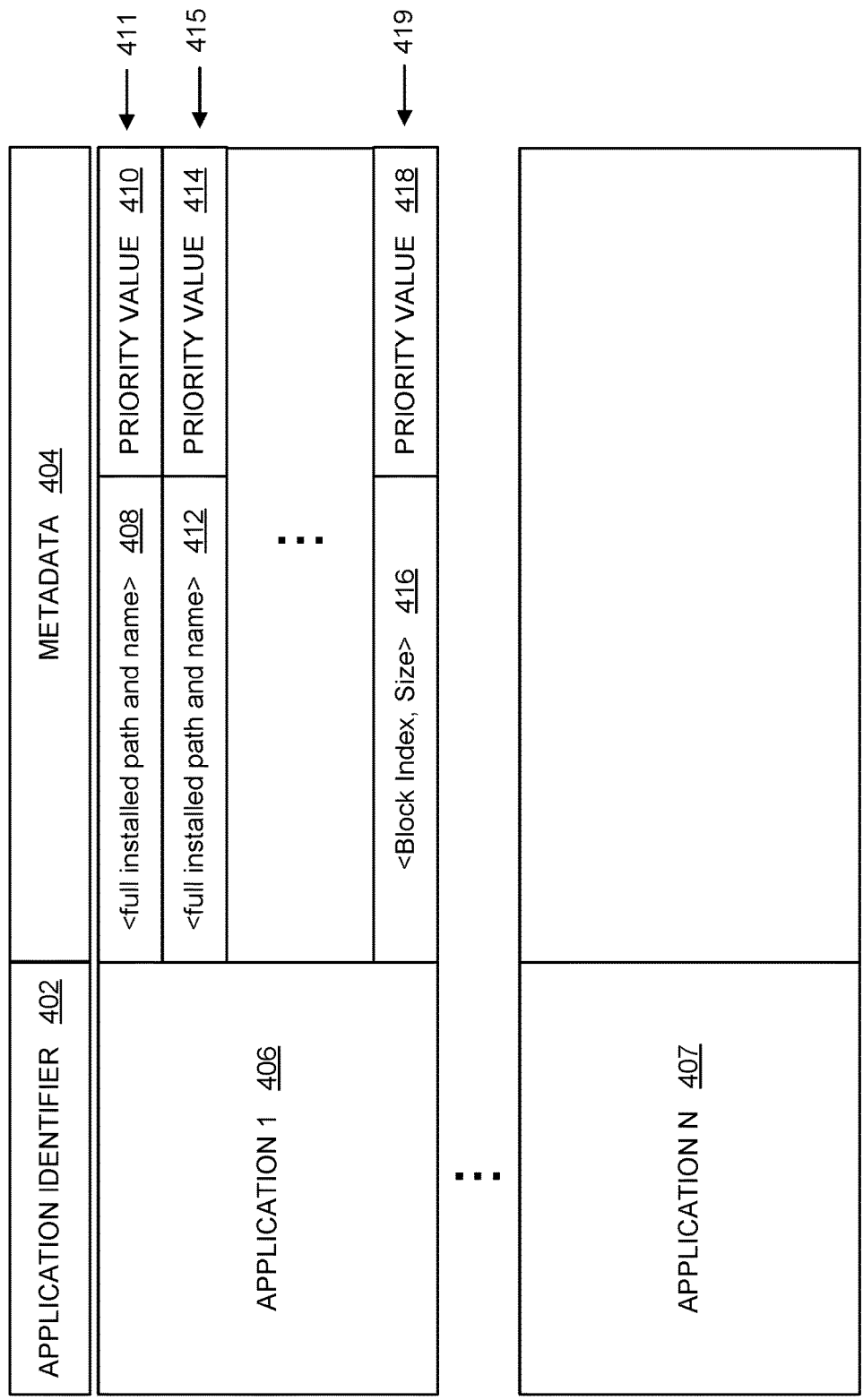
FIG. 4 is a data diagram illustrating an exemplary embodiment of the metadata table of FIG. 1.

FIG. 4 illustrates an exemplary embodiment of a decompression metadata table 124. The table 124 comprises an application identifier 402 for one or more applications (application identifier 1 406 ... application identifier N 407) installed in the NAND flash storage 104 with corresponding metadata 404 generated by the static metadata generation module 206. In the embodiment of FIG. 4, the metadata 404 comprises a flattened list of all library dependencies, shared libraries, files, data objects, etc. accessed by the application 134 with a corresponding priority value. The flattened list may define the full installed path and name of the dependent object(s). The priority value may be used when preemptively scheduling decompression. For example, the priority values may be used to schedule an order of decompression. Referring to FIG. 4, the <full installed path and name> 408 and priority value 410 may correspond to a dependent object 411. The <full installed path and name> 412 and priority value 414 may correspond to a dependent object 415.

As further illustrated in FIG. 4, the metadata 404 may further define one or more size-constrained blocks 419 with a priority value 418 and a block index and size (<Block Index, Size> data 416. For example, it should be appreciated that blocks of data and/or code may set a minimum (MIN) limit (e.g., 1 MB, 16 MB, 64 MB, etc.) for the uncompressed size. The size-constrained blocks 419 may be compressed and stored in the NAND flash storage 104 using the index of the block as identifier. It should be appreciated that a block-based approach may be used where the entire library has a significantly large size and is loaded in parts rather than a single process. The MIN size limit of the blocks may be set to limit any "blow up" in the number of blocks, which could increase the overhead. The static metadata generation module 206 may disregard any blocks below the size limit.

Having generally described the static metadata generation module 206, various embodiments will be described with reference to exemplary package file formats. In one embodiment, the application 134 comprises a native Android application. As known in the art, the components 204 for an Android application may comprise APK files that contain information about resources, libraries, etc. needed by the application. The static metadata generation module 206 may determine the one or more dependent objects from various APK files. A "MANIFEST" file lists the libraries that the application must be linked against. The "MANIFEST" file may specify one or more shared libraries that the application must be linked against. These dependent objects instruct the system 100 to include the code for the shared libraries in a class loader for the package. The "lib" object in the APK has all the compiled code (binary object files, etc) needed by the application. The "res" object comprises the directory containing resources not compiled into the "resources.arsc" file. The "assets" object comprises a directory containing applications assets. The "classes.dex" file defines the classes compiled in the dex file format and used by a virtual machine. The "resources.arsc" file contains precompiled resources.

Any of these, or other, objects may be used ahead of time to determine all the shared libraries, DEX class files, and other resource files needed by the application, which may be stored as metadata 404 in the decompression metadata table 124. It should be appreciated that this metadata can be used to preemptively decompress any of the items that are stored in compressed form in the NAND flash 104 as soon as the user triggers the application launch.

For executables in Linux, Unix, Android operating systems, the Executable and Linkable Format (ELF) is a common standard file format for executables, object code, and shared libraries. In these embodiments, the static metadata generation module 206 may get a list of the dynamically linked dependencies for an ELF executable/library. It should be appreciated that functionalities from utilities, such as, Readelf, objdumo, lld, etc. may be utilized to determine the dynamically linked dependencies. Table 1 below illustrates various indexes, tags, and values.

TABLE 1

| Determining Dynamically Linked Dependencies | | | |
|---|---|---|---|
| index | tag | | value |
| [0] | POSFLAG_1 | 0x1 | [LAZY] |
| [1] | NEEDED | 0x123 | libdebug.so.1 |
| [2] | NEEDED | 0x131 | libelf.so.1 |
| [3] | NEEDED | 0x13d | libc.so.1 |

Referring to Table 1, the tag POSFLAG_1 with a value of [LAZY] designates that the following NEEDED entry, libdebug.so.1, should be lazily loaded. As libelf.so.1 has no preceding LAZY flag, this library is loaded at the initial startup of the program. When a dynamic linker creates the memory segments for an object file, the dependencies (recorded in DT_NEEDED entries of the dynamic structure) define what shared objects are needed to supply the program services. By repeatedly connecting referenced shared objects and their dependencies, the dynamic linker builds a complete process image. In "lazy" binding, the symbol references are bound only when the image actually uses the symbols. The LAZY information instructs the dynamic linker to load the shared library only when needed, unlike the other libraries (not marked lazy) that are loaded during the program load.

In other embodiments, decompression may be scheduled for both the LAZY and non-LAZY shared libraries ahead of time so as to absorb the decompression time. Executing decompression when the dynamic linker does the program load may slow down the application launch time. Executing decompression during lazy binding may lower execution performance.

It should be appreciated that this data (for both the LAZY and the others not marked LAZY) may be used during the application installation time to determine the entire shared library tree (for all the dependent levels) for an application and store them in the decompression metadata table 124 for the application. Software module(s) in the O/S 122 may determine the dependency tree of libraries during install time. Because this is done for the entire library, this may apply to code, data, etc. that are a part of the library. The metadata 404 can be used to preemptively decompress any of the libraries that are stored in compressed form in the NAND flash 104 as soon as the user triggers application launch even before the dynamic linker recursively finds the dependencies and loads all the dependent libraries. In this manner, when the dynamic linker recursively finds each dependent library, the library is already available in decompressed form, thereby removing the decoding/decompression activity from the critical path of dynamic loading at application launch/execution.

The Portable Executable (PE) format is a file format for executables, object code, dynamic link libraries (DLLs), FON font files, and others used in 32-bit and 64-bit versions of the Windows operating systems. The PE format is a data structure that encapsulates the information necessary for the Windows O/S loader to manage the wrapped executable code. This includes dynamic library references for linking, API export and import tables, resource management data, and thread-local storate (TLS) data. Similar to the method for ELF executables/object-files, information from PE executables/objects/libraries may be use ahead of time to determine the entire shared library tree and keep them available in the metadata 404 of the application. The metadata 404 may be used to preemptively decompress any of the libraries that are stored in compressed form in the NAND flash 104.

Referring again to FIG. 2, when the application 134 is launched by a user, the application launcher component 208 may notify the preemptive NAND decompression scheduler 126 (reference numeral 209). In response to the notification from the application launcher component 208, the preemptive NAND decompression scheduler 126 accesses the decompression metadata table 124 and obtains the corresponding metadata 404 for the application 134 (reference numeral 211). It should be appreciated that the decompression metadata table 124 may be saved persistently and under the control of the O/S 122 as long as the application 134 is installed in the system 100. If the application is uninstalled, the metadata 404 for the application may be deleted. When the O/S 122 detects an application launch trigger (e.g., a user touching an application icon, etc.), the O/S 122 immediately gives the signal to preemptively decompress any dependent objects or resources (e.g., code, libraries, data files, size-constrained blocks, etc.) that exist in the NAND flash 104.

Referring to the embodiment of FIG. 2, at reference numeral 213, the preemptive NAND decompression scheduler 126 may preemptively schedule decompression of the dependent objects via, for example, the application execution environment 210. It should be appreciated that the decompression of the dependent objects occurs before the application execution environment 210 resolves the dependencies and loads the dependent objects in uncompressed form from the NAND flash 104 (reference numeral 215).

As mentioned above, the decompression metadata table 124 may be dynamically updated during execution of the application 134 based on execution activity. During execution of the application 134, the dynamic metadata generation module 212 may detect file, library, and block access for running the application 134 (reference numeral 217). Based on the execution activity from one or more runs of the application 134, the dynamic metadata generation module 212 may dynamically extract further dependencies and update the decompression metadata table 124 to include the further dependent objects (reference numeral 219).

Figure 3:
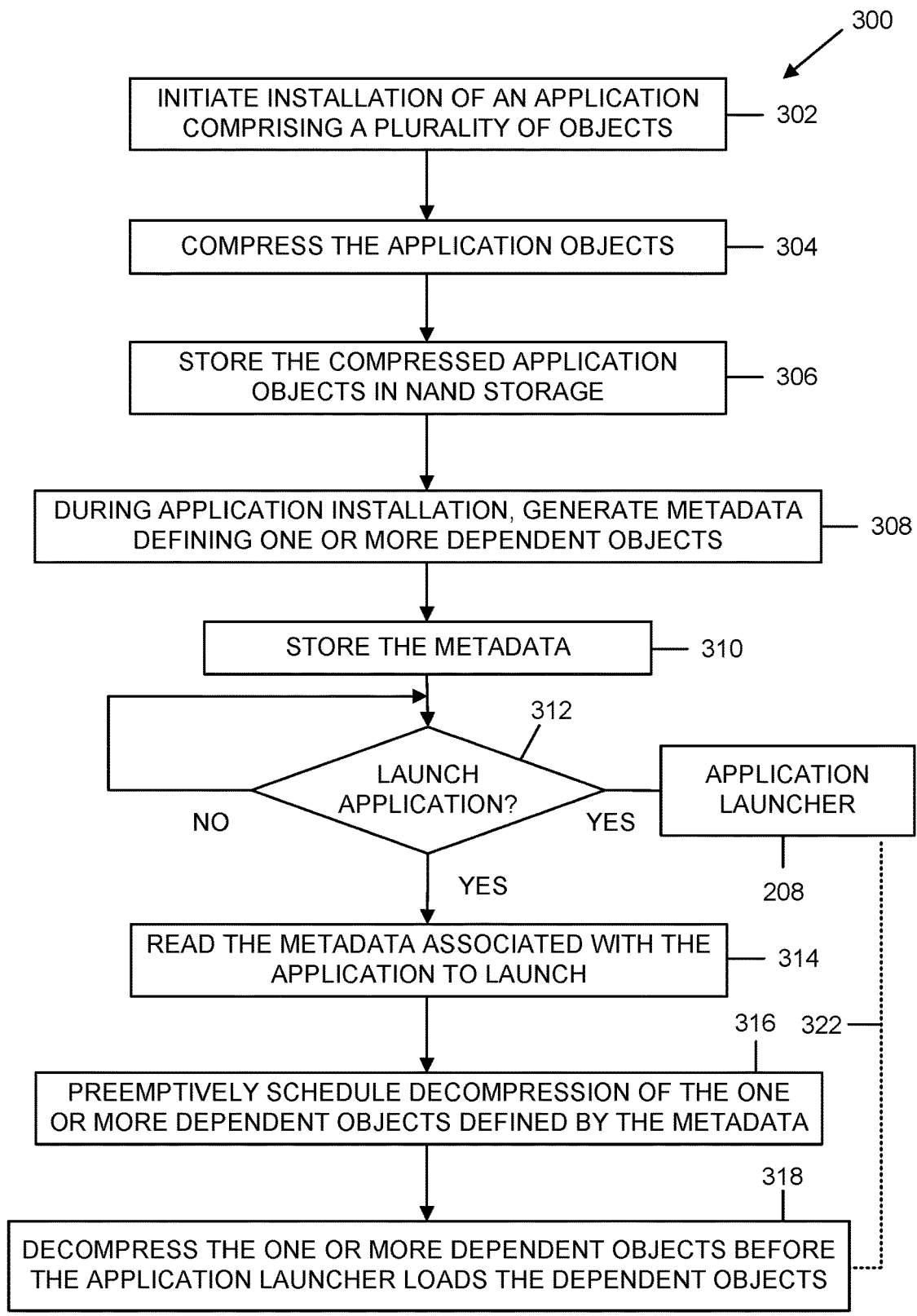
FIG. 3 is a flowchart illustrating an embodiment of a method for preemptively decompressing compressed objects in the system of FIG. 1.

FIG. 3 illustrates an embodiment of a method 300 for preemptively decompressing dependent objects in the system 100. At block 302, installation of an application 134 to the NAND flash 104 is initiated. The application 134 may comprise a plurality of objects, as described above. At block 304, the compression/decompression module 118 compresses the application objects. As mentioned above, the application 134 may be directly available in compressed form during installation. In this case, the application 134 may be directly installed in the existing compressed form, or it can be decompressed and then compressed again but into a different form compared to the original compressed form and using a different compression algorithm and/or parameters. If a compressed application is decompressed and then again compressed during installation into the NAND, the metadata may be created during installation time. However, if the received application in compressed form is installed in the NAND 104, the metadata may be created when the application 134 is decompressed for the first time during the first time the application is launched. In this manner, the benefits of preemptive scheduling and decompression may take effect in any future subsequent application launches once the metadata has been created.

At block 306, the compressed application objects are stored in the NAND flash 104 via the flash controller 108. During application installation (e.g., after block 302), at block 308, the static metadata generation module 206 generates metadata 404 defining one or more dependent objects or resources (e.g., code, libraries, data files, size-constrained blocks, etc.) that will be stored in the NAND flash 104. At block 310, the generated metadata 404 is stored in the decompression metadata table 124, which may be managed by the O/S 122. In response to the application being launched (decision block 312), the preemptive NAND decompression scheduler 126 reads (block 314) the metadata 404 for the to-be-launched application 134 stored in the NAND flash 104. At block 316, the preemptive NAND decompression scheduler 126 preemptively schedules decompression of the one or more dependent objects defined by the metadata 404. At block 318, the dependent objects are decompressed by the compression/decompression module 118 before the application launcher component 208 (reference numeral 322) resolves the dependencies and loads the dependent objects from the NAND flash 104.

Figure 5:
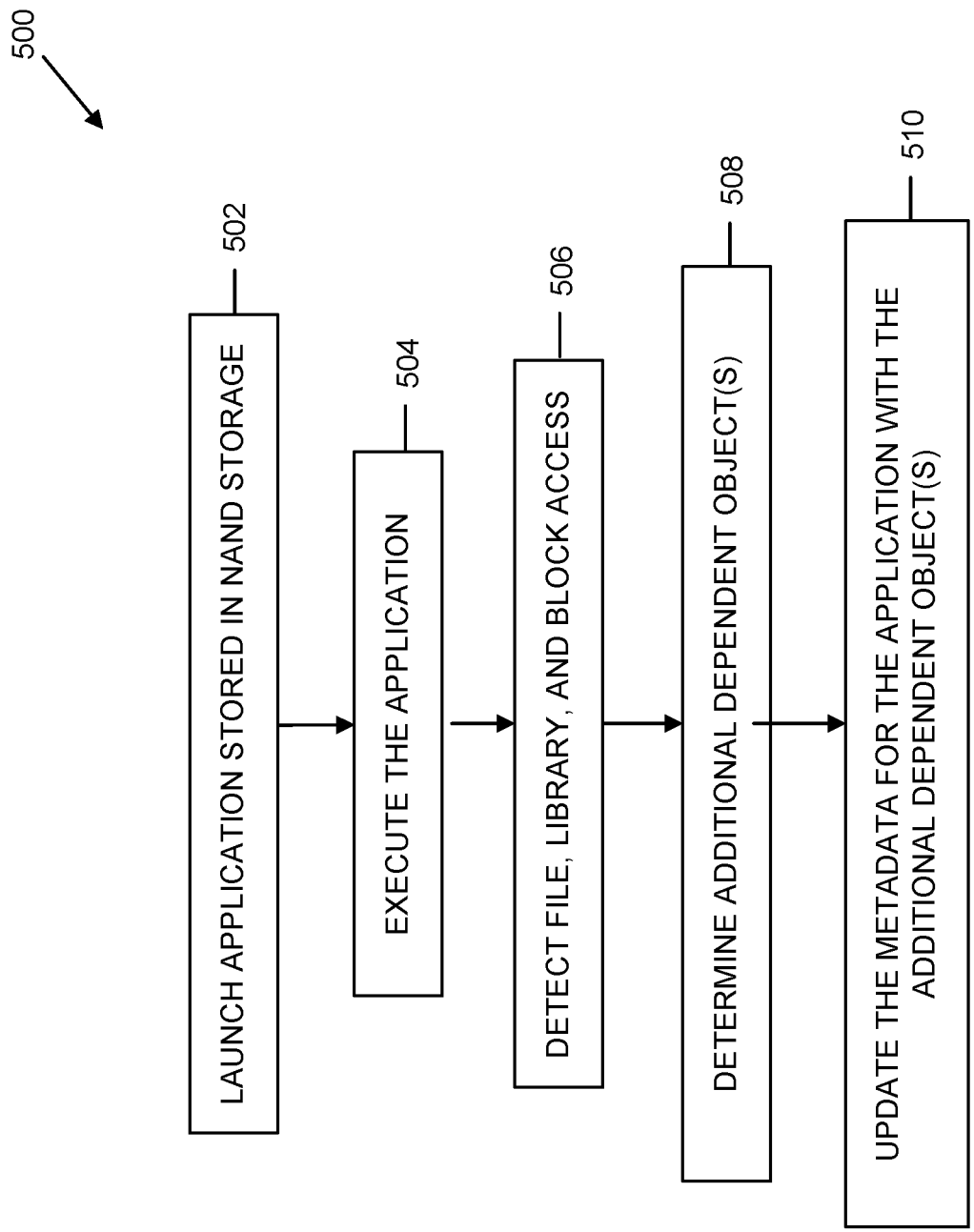
FIG. 5 is a flowchart illustrating an embodiment of a method for dynamically updating the metadata table of FIG. 4.

FIG. 5 illustrates an embodiment of a method 500 for dynamically updating the metadata 404 for an application 134 during one or more runs of the application. At block 502, a compressed application 134 stored in the NAND flash 104 is launched. At block 504, the compressed application may be decompressed and executed in a convention manner (or in the manner described above based on the metadata 404). At block 506, the dynamic metadata generation module 212 may detect, for example, file, library, and block access. At block 508, the dynamic metadata generation module 212 extracts or otherwise determined additional dependencies based on the application execution activity. At block 510, the dynamic metadata generation module 212 updates the metadata 404 for the application 134 with the additional dependencies determined during execution activity.

It should be appreciated that the additional metadata may be generated from a predetermined or calculated number of initial runs of an installed APK or code about the files, libraries, size-constrained blocks, data sets it is utilizing or accessing. The updated metadata may be used in future executions of the application to preemptively decompress the dependent files, libraries, size-constrained blocks, data sets, etc. as soon as the application 134 is launched. The metadata for the application 134 may stabilize after a few runs of the application 134 and can be used for the entire lifetime of the application 134 installed in the device. For code, libraries, and files, the metadata may keep data associated with their storage paths and filenames. For size-constrained blocks, the metadata may define block index and size. For application data, the metadata may track information of the page indices the application 134 accessed. The O/S 122 may be used to keep track of where the pages exist in NAND flash 104. The metadata may be saved persistently and under the control of the O/S 122. When the O/S 122 detects application launch trigger, it immediately gives the signal to preemptively decompress any dependent resources (e.g., code, libraries, data, files) that exist in the NAND flash 104.

It should be further appreciated that preemptive decompression for shared libraries loaded through Lazy binding may use alternative methods, such as, for example dlopen( ) and dlsym( ). The dlopen( ) function makes an executable object file specified by pathname and filename available to the calling program during the program execution. The dlopen( ) call effectively does dynamic loading of the executable object file specified by pathname and filename at runtime. The calling program may then start using the functionalities provided by the dynamically loaded executable object file by discovering functions and symbols implemented in the dynamically loaded object file using dlsym( ) calls. A successful dlopen( ) function returns a handle that the calling program would need to use on subsequent calls using dlsym( ). The dlsym( ) function obtains the address of a symbol defined within the runtime dynamically loaded object file made accessible through a dlopen( ) call. The name of a symbol, as a character string, is passed as an argument to the dlsym( ) function that then searches for the named symbol in all objects loaded dynamically at runtime.

Metadata information can be dynamically obtained during execution of an application by intercepting the libraries loaded using dlopen( ) APIs. Changes can be made in dlopen( ) API to capture the library name and save into the metadata 404 for the application 134. Since the metadata 404 is managed by the O/S, the information can be readily saved in the decompression metadata table 124. The metadata 404 can be used to preemptively decompress the libraries the next time the application 134 is launched. The dynamic generation of metadata based on application execution activity provides for periodic or continuous update of the decompression metadata table 124 and can detect any missing libraries/files, size-constrained blocks, etc. that may be left out by the static metadata generation module 206.

In further embodiments, preemptive decompression may be performed for data saved and cached by applications 134 on the NAND flash 104. The cached data may exist as file names with full path (e.g., persistent caches for the a mobile browser APK). Dynamic metadata generation module 212 may detect the full paths and names to the caches and data an application saves, and can include them in the decompression metadata table 124 for the application 134 as and when the files are accessed. The data and cache files can be preemptively decompressed as soon as the application is launched.

For size-constrained data blocks, the block index and size may be used for identification. The static metadata generation module 206 may provide the initial seed for the decompression metadata table 124 and assist the first time the application 134 is launched. The dynamic metadata generation module 212 helps to update and refine the initial metadata and can cover, for example, size-constrained blocks of code and/or data using block index as identifiers. The priority value (e.g., 410, 414, and 418 in FIG. 4) is associated with each entry in the decompression metadata table 124 to indicate how actively/frequently the item is used by the application 134 every time it is launched and how early in the application execution phase the item is utilized. The priority value(s) may be periodically updated by the dynamic metadata generation module 212. The decompression activity for the needed items for a particular application 134 may follow a priority order. For example, the item that is frequently used and the use appears earlier in the application execution may be assigned a higher priority because preemptively decompressing that item may be most impactful.

Figure 6:
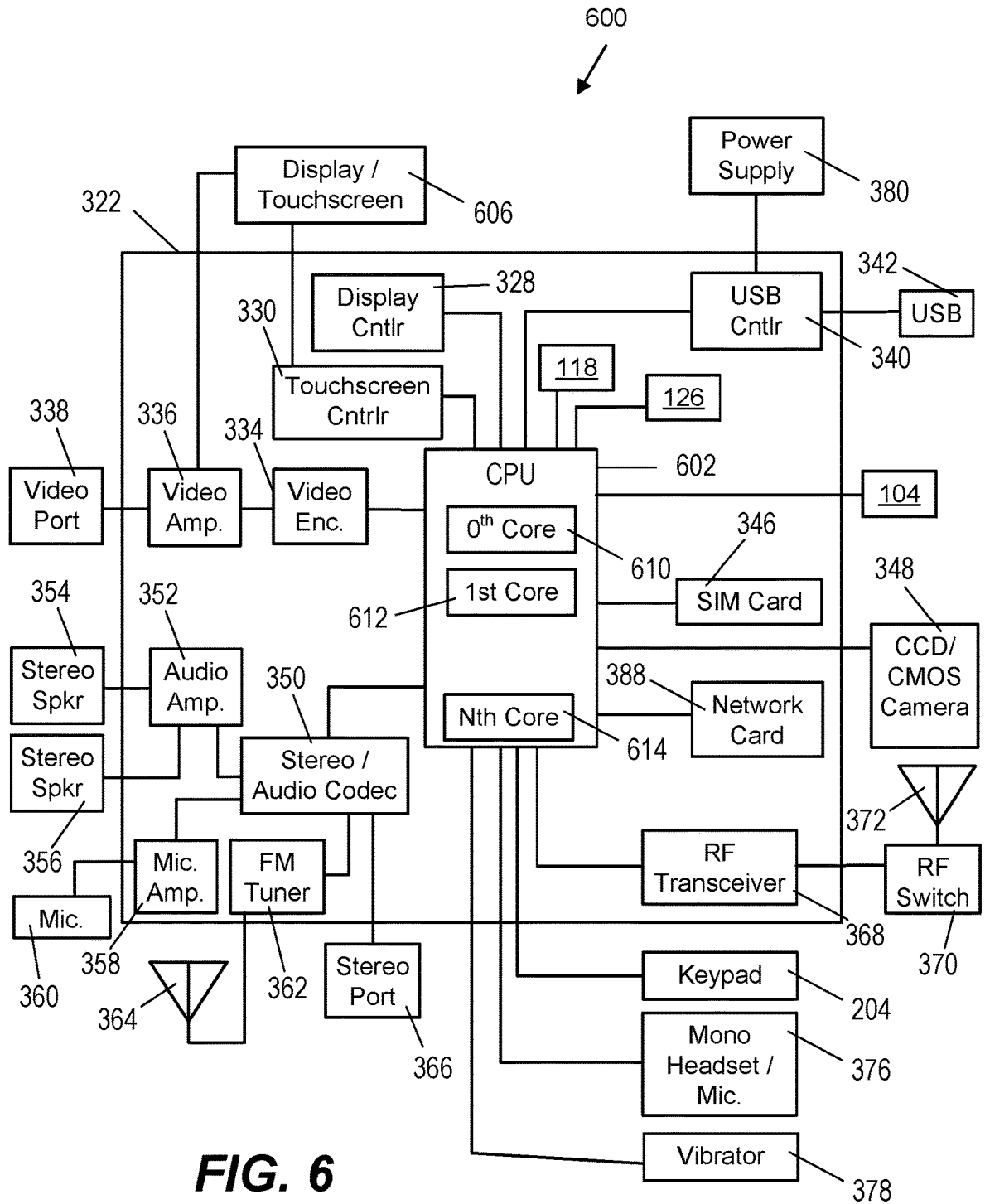
FIG. 6 is a block diagram of an embodiment of a portable computing device for incorporating the system of FIG. 1.

As mentioned above, the system 100 may be incorporated into any desirable computing system. FIG. 6 illustrates the system 100 incorporated in an exemplary portable computing device (PCD) 600. It will be readily appreciated that certain components of the system 100 may be included on the SoC 322 (e.g., data compression component 118 and the preemptive NAND decompression scheduler 126) while other components (e.g., the DRAM 106, the NAND flash 104) may be external components coupled to the SoC 322. The SoC 322 may include a multicore CPU 602. The multicore CPU 602 may include a zeroth core 610, a first core 612, and an Nth core 614. One of the cores may comprise, for example, a graphics processing unit (GPU) with one or more of the others comprising the CPU.

A display controller 328 and a touch screen controller 330 may be coupled to the CPU 602. In turn, the touch screen display 606 external to the on-chip system 322 may be coupled to the display controller 328 and the touch screen controller 330.

FIG. 6 further shows that a video encoder 334, e.g., a phase alternating line (PAL) encoder, a sequential color a memoire (SECAM) encoder, or a national television system(s) committee (NTSC) encoder, is coupled to the multicore CPU 602. Further, a video amplifier 336 is coupled to the video encoder 334 and the touch screen display 606. Also, a video port 338 is coupled to the video amplifier 336. As shown in FIG. 6, a universal serial bus (USB) controller 340 is coupled to the multicore CPU 602. Also, a USB port 342 is coupled to the USB controller 340.

Further, as shown in FIG. 6, a digital camera 348 may be coupled to the multicore CPU 602. In an exemplary aspect, the digital camera 348 is a charge-coupled device (CCD) camera or a complementary metal-oxide semiconductor (CMOS) camera.

As further illustrated in FIG. 6, a stereo audio coder-decoder (CODEC) 350 may be coupled to the multicore CPU 602. Moreover, an audio amplifier 352 may coupled to the stereo audio CODEC 350. In an exemplary aspect, a first stereo speaker 354 and a second stereo speaker 356 are coupled to the audio amplifier 352. FIG. 6 shows that a microphone amplifier 358 may be also coupled to the stereo audio CODEC 350. Additionally, a microphone 360 may be coupled to the microphone amplifier 358. In a particular aspect, a frequency modulation (FM) radio tuner 362 may be coupled to the stereo audio CODEC 350. Also, an FM antenna 364 is coupled to the FM radio tuner 362. Further, stereo headphones 366 may be coupled to the stereo audio CODEC 350.

FIG. 6 further illustrates that a radio frequency (RF) transceiver 368 may be coupled to the multicore CPU 602. An RF switch 370 may be coupled to the RF transceiver 368 and an RF antenna 372. A keypad 204 may be coupled to the multicore CPU 602. Also, a mono headset with a microphone 376 may be coupled to the multicore CPU 602. Further, a vibrator device 378 may be coupled to the multicore CPU 602.

FIG. 6 also shows that a power supply 380 may be coupled to the on-chip system 322. In a particular aspect, the power supply 380 is a direct current (DC) power supply that provides power to the various components of the PCD 600 that require power. Further, in a particular aspect, the power supply is a rechargeable DC battery or a DC power supply that is derived from an alternating current (AC) to DC transformer that is connected to an AC power source.

FIG. 6 further indicates that the PCD 600 may also include a network card 388 that may be used to access a data network, e.g., a local area network, a personal area network, or any other network. The network card 388 may be a Bluetooth network card, a WiFi network card, a personal area network (PAN) card, a personal area network ultra-low-power technology (PeANUT) network card, a television/cable/satellite tuner, or any other network card well known in the art. Further, the network card 388 may be incorporated into a chip, i.e., the network card 388 may be a full solution in a chip, and may not be a separate network card 388.

As depicted in FIG. 6, the touch screen display 606, the video port 338, the USB port 342, the camera 348, the first stereo speaker 354, the second stereo speaker 356, the microphone 360, the FM antenna 364, the stereo headphones 366, the RF switch 370, the RF antenna 372, the keypad 374, the mono headset 376, the vibrator 378, and the power supply 380 may be external to the on-chip system 322.

It should be appreciated that one or more of the method steps described herein may be stored in the memory as computer program instructions, such as the modules described above. These instructions may be executed by any suitable processor in combination or in concert with the corresponding module to perform the methods described herein.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, NAND flash, NOR flash, M-RAM, P-RAM, R-RAM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Alternative embodiments will become apparent to one of ordinary skill in the art to which the invention pertains without departing from its spirit and scope. Therefore, although selected aspects have been illustrated and described in detail, it will be understood that various substitutions and alterations may be made therein without departing from the spirit and scope of the present invention, as defined by the following claims.

What is claimed is:

1. A method for scheduling decompression of application objects, the method comprising:
   initiating an installation of the application to a flash memory device;
   compressing one or more dependent objects associated with the application to form one or more dependent compressed objects, wherein the one or more dependent objects comprise files that the application depends on for execution, wherein the one or more dependent objects include at least one of a shared native executable library file, a shared executable object file, and a platform executable object file;
   storing the one or more dependent compressed objects in the flash memory device;
   during the installation of the application to the flash memory device, generating metadata for the application, the metadata identifying the one or more dependent compressed objects, the metadata comprising an application identifier and a priority value, the priority value determining an order for decompressing the one or more dependent compressed objects prior to launch of the application and prior to the launched application accessing the one or more dependent objects, each priority value that is assigned to a dependent compressed object is based on frequency of use by the application, each priority value of a dependent compress object being changeable when the frequency of use by the application of a dependent compressed object changes;
   storing the metadata in a decompression metadata table; and
   in response to a command to launch of the application:
      determining from the stored metadata the one or more dependent compressed objects associated with the application to be launched;
      preemptively scheduling decompression of the one or more dependent compressed objects based on the stored metadata comprising one or more application identifiers and one or more priority values; and
      decompressing the one or more dependent compressed objects based on the preemptively scheduled decompression as the application is being launched and before the application accesses the one or more dependent objects, rather than decompressing the one or more dependent compressed objects when the launched application first accesses the one or more dependent objects.

2. The method of claim 1, wherein decompressing the one or more dependent compressed objects before the application accesses the one or more dependent objects further comprises:
   decompressing the one or more dependent compressed objects before an application launcher loads the dependent objects.

3. The method of claim 1, wherein the one or more dependent objects comprises one or more of a dependent file, a dependent library, a shared library, and one or more size-constrained blocks.

4. The method of claim 1, wherein the metadata further comprises a list of installed paths and filenames, and a plurality of block indices and sizes.

5. The method of claim 1, wherein the flash memory device comprises NAND flash.

6. The method of claim 1, further comprising:
   during execution of the application, determining one or more additional dependent objects; and
   updating the stored metadata with the one or more additional dependent objects.

7. The method of claim 1, wherein the preemptively scheduling decompression of the one or more dependent compressed objects based on the stored metadata comprises:
   scheduling decompression of the one or more dependent compressed objects before a dynamic linker resolves one or more dependency associated with the one or more dependent objects.

8. A system for scheduling decompression of application objects, the system comprising:
- means for initiating an installation of the application to a flash memory device;
- means for compressing one or more dependent objects associated with the application to form one or more dependent compressed objects, wherein the one or more dependent objects comprise files that the application depends on for execution, wherein the one or more dependent objects include at least one of a shared native executable library file, a shared executable object file, and a platform executable object file;
- means for storing the one or more dependent compressed objects in the flash memory device;
- means for generating during the installation of the application to the flash memory device metadata for the application, the metadata identifying the one or more dependent compressed objects, the metadata comprising an application identifier and a priority value, the priority value determining an order for decompressing the one or more dependent compressed objects prior to launch of the application and prior to the launched application accessing the one or more dependent objects, each priority value that is assigned to a dependent compressed object is based on frequency of use by the application, each priority value of a dependent compress object being changeable when the frequency of use by the application of a dependent compressed object changes;
- means for storing the metadata in a decompression metadata table; and
- in response to a command to launch of the application:
  - determining from the stored metadata the one or more dependent compressed objects associated with the application to be launched;
  - preemptively scheduling decompression of the one or more dependent compressed objects based on the stored metadata comprising one or more application identifiers and one or more priority values; and
  - decompressing the one or more dependent compressed objects based on the preemptively scheduled decompression as the application is being launched and before the application accesses the one or more dependent objects, rather than decompressing the one or more dependent compressed objects when the launched application first accesses the one or more dependent objects.

9. The system of claim 8, further comprising:
means for decompressing the one or more dependent compressed objects before an application launcher loads the dependent objects.

10. The system of claim 9, wherein the means for decompressing the one or more dependent compressed objects comprises one of a central processing unit (CPU) and a compression co-processor with a dedication random access memory (RAM).

11. The system of claim 9, wherein the one or more dependent objects comprises one or more of a dependent file, a dependent library, a shared library, and one or more size-constrained blocks.

12. The system of claim 8, wherein the metadata further comprises a list of installed paths and filenames.

13. The system of claim 8, wherein the flash memory device comprises NAND flash.

14. The system of claim 8, further comprising:
means for determining one or more additional dependent objects during execution of the application; and
means for updating the stored metadata with the one or more additional dependent objects.

15. The system of claim 8, wherein the means for preemptively scheduling decompression of the one or more dependent compressed objects based on the stored metadata comprises:
means for scheduling decompression of the one or more dependent compressed objects before a dynamic linker resolves one or more dependency associated with the one or more dependent objects.

16. A computer program embodied in a memory and executable by a processor for scheduling decompression of application objects, the computer program comprising logic configured to:
- initiate an installation of the application to a flash memory device;
- compress one or more dependent objects associated with the application to form one or more dependent compressed objects, wherein the one or more dependent objects comprise files that the application depends on for execution, wherein the one or more dependent objects include at least one of a shared native executable library file, a shared executable object file, and a platform executable object file;
- store the one or more dependent compressed objects in the flash memory device;
- during the installation of the application to the flash memory device, generate metadata for the application, the metadata identifying the one or more dependent compressed objects, the metadata comprising an application identifier and a priority value, the priority value determining an order for decompressing the one or more dependent compressed objects prior to launch of the application and prior to the launched application accessing the one or more dependent objects, each priority value that is assigned to a dependent compressed object is based on frequency of use by the application, each priority value of a dependent compress object being changeable when the frequency of use by the application of a dependent compressed object changes;
- store the metadata in a decompression metadata table; and
- in response to a command to launch of the application:
  - determine from the stored metadata the one or more dependent compressed objects associated with the application to be launched;
  - preemptively schedule decompression of the one or more dependent compressed objects based on the stored metadata comprising one or more application identifiers and one or more priority values; and
  - decompress the one or more dependent compressed objects based on the preemptively scheduled decompression as the application is being launched and before the application accesses the one or more dependent objects, rather than decompressing the one or more dependent compressed objects when the launched application first accesses the one or more dependent objects.

17. The computer program of claim 16, wherein the logic configured to decompress the one or more dependent compressed objects before the application accesses the one or more dependent objects further comprises logic configured to:
decompress the one or more dependent compressed objects before an application launcher loads the dependent objects.

18. The computer program of claim 16, wherein the one or more dependent objects comprises one or more of a dependent file, a dependent library, a shared library, and one or more size-constrained blocks.

19. The computer program of claim 16, wherein the metadata further comprises a list of installed paths and filenames.

20. The computer program of claim 16, wherein the flash memory device comprises NAND flash.

21. The computer program of claim 16, further comprising logic configured to:
determine one or more additional dependent objects during execution of the application; and
update the stored metadata with the one or more additional dependent objects.

22. The computer program of claim 16, wherein the logic configured to preemptively schedule decompression of the one or more dependent compressed objects based on the stored metadata comprises: logic configured to schedule decompression of the one or more dependent compressed objects before a dynamic linker resolves one or more dependency associated with the one or more dependent objects.

23. A system for scheduling decompression of an application from flash storage, the system comprising:
a flash memory device;
an application installer configured to:
  initiate an installation of the application to the flash memory device;
  compress one or more dependent objects associated with the application to form one or more dependent compressed objects, wherein the one or more dependent objects comprise files that the application depends on for execution, wherein the one or more dependent objects include at least one of a shared native executable library file, a shared executable object file, and a platform executable object file;
  store the one or more dependent compressed objects in the flash memory device; and
a preemptive decompression scheduler configured to:
  during the installation of the application to the flash memory device, generate and store in a table metadata identifying the one or more dependent compressed objects, the metadata comprising an application identifier and a priority value, the priority value determining an order for decompressing the one or more dependent compressed objects prior to launch of the application and prior to the launched application accessing the one or more dependent objects, each priority value that is assigned to a dependent compressed object is based on frequency of use by the application, each priority value of a dependent compress object being changeable when the frequency of use by the application of a dependent compressed object changes;
  in response to a command to launch of the application by an application launcher, determine from the stored metadata the one or more dependent compressed objects associated with the application to be launched;
  preemptively schedule decompression of the one or more dependent compressed objects based on the stored metadata comprising one or more application identifiers and one or more priority values; and
a compression/decompression module configured to decompress the one or more dependent compressed objects based on the preemptively scheduled decompression as the application is being launched and before the application accesses the one or more dependent objects, rather than decompressing the one or more dependent compressed objects when the launched application first accesses the one or more dependent objects.

24. The system of claim 23, wherein preemptively schedule decompression of the one or more dependent compressed objects further comprises scheduling the compression/decompression module decompress the one or more dependent compressed objects before the application launcher or a loader loads the dependent objects.

25. The system of claim 24, wherein the one or more dependent objects comprises one or more of a dependent file, a dependent library, a shared library, and one or more size-constrained blocks.

26. The system of claim 23, wherein the metadata further comprises a list of installed paths and filenames.

27. The system of claim 23, wherein the flash memory device comprises NAND flash.

28. The system of claim 23, further comprising a dynamic metadata generation module configured to:
determine one or more additional dependent compressed objects during execution of the decompressed application; and
update the stored metadata with the one or more additional dependent objects.

29. The system of claim 23, wherein the preemptive decompression scheduler is configured to schedule decompression of the one or more dependent objects before a dynamic linker resolves one or more dependency associated with the one or more dependent objects.

30. The system of claim 23, wherein the preemptive decompression scheduler resides on a system on chip (SoC) electrically coupled to the flash memory device.

* * * * *